United States Patent [19]
Brock et al.
[11] 3,813,766
[45] June 4, 1974

[54] PROCESS FOR MANUFACTURE OF A MAGNETIC TRANSDUCER USING A PRE-EXISTING UNITARY FOIL

[75] Inventors: George W. Brock, Boulder; Wayne McCormick, Arvada; Sidney H. Smith, Broomfield, all of Colo.

[73] Assignee: International Business Machines Corporation, Armonk, N.Y.

[22] Filed: Dec. 20, 1971

[21] Appl. No.: 210,021

[52] U.S. Cl. .......... 29/603, 179/100.2 C
[51] Int. Cl. ........ G11b 5/16, G11b 5/20, G11b 5/42
[58] Field of Search ....... 179/100.2 C; 346/174.1 F; 340/74 MC; 29/603

[56] References Cited

UNITED STATES PATENTS

| | | | |
|---|---|---|---|
| 2,647,167 | 7/1953 | Rettinger | 179/100.2 C |
| 2,694,754 | 11/1954 | Connell | 179/100.2 C |
| 2,941,045 | 6/1960 | Connell | 179/100.2 C |
| 3,157,748 | 11/1964 | Eldredge | 179/100.2 C |
| 3,344,237 | 9/1967 | Gregg | 179/100.2 C |
| 3,639,699 | 2/1972 | Tiemann | 179/100.2 C |
| 3,662,361 | 5/1972 | Mee | 179/100.2 C |

*Primary Examiner*—Bernard Konick
*Assistant Examiner*—Alfred H. Eddleman
*Attorney, Agent, or Firm*—Donald W. Margolis

[57] ABSTRACT

Magnetic transducing heads capable of reading and writing magnetic information in the form of a pattern of magnetization on a magnetic recording medium are provided utilizing a unitary structure of magnetic sheet metal foil and conductive, non-magnetic metal foil and thin film deposition techniques. In the preferred embodiment, the transducing heads consist of a monolithic sandwich of thin metallic magnetic foil forming a magnetic core enclosing a conductive non-magnetic metal foil exciting winding.

The transducer is prepared from a prefabricated unitary laminate of magnetic metal foil and conductive metal foil which laminate is shaped into a magnetic head by, for example, photolithographic and deposition techniques.

10 Claims, 6 Drawing Figures

PROCESS FOR MANUFACTURE OF A MAGNETIC TRANSDUCER USING A PRE-EXISTING UNITARY FOIL

CROSS REFERENCE TO RELATED APPLICATION

The following application, assigned to the assignee of the present invention, is related: U.S. Pat. application, Ser. No. 209,877, now U.S. Pat. No. 3,766,340, entitled "Method of Manufacturing Magnetic Transducers," F. W. Hahn, Jr., inventor, filed Dec. 20, 1971.

BACKGROUND OF THE INVENTION

1. Field of the Invention

This invention relates to methods of manufacturing an electromagnetic transducer and to the resulting magnetic heads which are useful for providing electrical to magnetic transducing action to write and read information in relation to a magnetic medium in response to or for producing electrical signals. The method of manufacture includes deposition techniques and techniques of photoetching and sheet metal foil manipulation.

2. Description of the Prior Art

Magnetic transducing heads have been in use since the inception of magnetic recording technology. Basically, every magnetic transducer is in the form of a magnetically permeable core member including at least one finite nonpermeable discontinuity forming a gap and at least one electrically conductive exciting winding associated with the core. A changing magnetic field in close proximity to the gap, such as that caused by movement of a previously recorded magnetic record medium, causes an electrical signal to be generated in the associated conductor which signal is sensed by associated devices as a bit of information. Conversely, an electric current generated through the conductive winding causes a magnetic field to be generated within the core, which signal can be externally detected at the gap as a magnetic field. A magnetic record medium in proximity to the gap at the time a magnetic signal is generated will retain the information imparted by this field in the form of a magnetic signal.

Traditionally, magnetic transducers have been formed of gross pieces of metallic or ceramic magnetically permeable material manually assembled and wound with conductive wire. More recently, miniaturized recording heads fabricated by techniques similar to those used in integrated-circuit technology, namely evaporation, sputtering, plating and photoetching have been proposed.

In most instances, batch-fabricated or thin film heads have been prepared entirely by a series of additive deposition steps including the subtraction of some portions after they have been deposited. Typically, a substrate is required for such a process. Material, such as rigid, nonconductive, hard ceramic is often selected as a substrate, although conductive substrates may be used. Where a conductive substrate is used, an additional step of placing an insulating coating upon the substrate is required. Then, for example, a film of magnetic material is deposited upon the substrate. The magnetic material may be deposited through a mask into a desired shape, or, as is generally the case, it is deposited as a film and converted to a desired shape through multistep photoetching techniques. Next, a conductor is deposited in juxtaposition to the magnetic film, and again modified with multistep photoetching techniques to obtain the desired single turn or multiturn shape. Typically, the conductor is in the form of a stripe directly over a portion of the magnetic film with the ends of the conductor available for connection with external electrical read or write circuitry. Where the magnetic film is conductive, a layer of insulation is normally deposited intermediate the film and conductor to prevent short-circuiting of the current. Material to provide and support a gap in the head is required at the pole tip of the magnetic film and may be provided by the conductor or insulator or by material deposited specifically for the purpose of forming a gap. In some instances, a gap is provided in the magnetic core by the physical removal of magnetic material from the desired gap area and substitution of non-magnetic material in its place. Finally, an additional layer of magnetic film is provided by multistep deposition and photoetching techniques in conjunction with the first magnetic film to complete the magnetic core.

As outlined, every portion of the prior art heads are provided by additive steps of deposition and photoetching of the deposited film. With the exception of the substrate, no material utilized in producing these prior art heads is capable of being handled manually or mechanically during the manufacturing process. Of course, where photoetching is required, only one surface can be etched at a time due to the interference of the substrate. Furthermore, the magnetic characteristics of deposited films are at times difficult to control or reproduce and may not be comparable in quality to the magnetic permeability and saturation characteristics of, for example, magnetic foil material. Additionally, the deposited films are prone to adhesion failures or delamination unless they are deposited under very stringent conditions of quality control.

Also in the prior art, magnetic transducers have been made using laminated material. Laminated heads have been made using multiple layers of thin magnetic foil material separated from one another by nonpermeable nonconductive material to limit eddy current losses. However, these prior art structures are quite large and thick by comparison with thin film batch-fabricated heads. They normally consist of a dozen or more laminae, each on the order of at least about 1 mil thick. Laminated heads are usually formed from single laminae shaped mechanically or by etching and then joined, for example, by nonconductive adhesive to form a laminated portion of a head. This laminated portion, when joined with another laminate and wound with conductive wire forms a head. Occasionally, multiple foils have been joined adhesively and an entire laminate formed in a single mechanical or etching procedure. But, even utilizing this technique, the resulting structure is only a portion of a head and it also lacks an exciting winding. Also, laminated structures including conductive and magnetic laminae have been constructed to form electromagnetic shielding between heads. Where conductive and magnetic laminae have been joined to form a shield, the shield structure did not include a transducing gap nor was it used for reading or writing magnetic information, even when a current is passed through the conductive portions to improve its shielding characteristics.

SUMMARY OF INVENTION

In accordance with this invention, a transducer is provided which is comprised of magnetic metallic foil portions laminated with conductive material and shaped and finished by thin film techniques. In one aspect of this invention, the foil material is laminated in the form of two layers of magnetic material enclosing a conductive foil and shaped by photoetching techniques. In another aspect of this invention, a two-layer, prelaminated magnetic foil and conductive foil are shaped by photoetching techniques to produce a transducer element, and another layer of magnetic material is provided by thin film deposition techniques or utilizing another magnetic foil to complete the magnetic core. Methods of providing these transducers in either discrete or multichannel form are disclosed.

As used herein, "foil" is intended to mean a thin sheet of metal in a discrete form. "Unitary" and "laminated" foil and "monolithic sandwich," as used herein, all refer to a preexisting structure consisting of at least two foils joined together in a substantially monolithic structure, at least one foil being magnetic and at least one foil being non-magnetic and conductive. "Transducer element," as used herein, refers to either a complete transducer assembly or a transducer subassembly including at least one magnetically permeable pole tip portion and an exciting winding portion.

By their nature, foil and laminated foil provide a gross material which can be handled and which is usable, as taught herein, in the batch-fabrication of miniature heads and especially multitrack miniature transducers. Since the magnetic foil material is manufactured separately from the head-making process, its magnetic characteristics and thickness can be carefully controlled through well known directional annealing and rolling processes. The magnetic foil is therefore capable of displaying good and predictable magnetic and physical characteristics at all times. Similarly, conductive non-magnetic foil can be carefully chosen for thickness and composition to provide, for example, specific head gap thickness, conductivity or wear characteristics.

The use of prefabricated laminated foil reduces the number of process steps in miniature head manufacturing. Steps eliminated include almost all additive steps such as deposition of the magnetic film and conductive film and the subsequent multistep photoetching after each and every deposition step to provide the magnetic and conductive materials in a desired shape. If desired, the prefabricated unitary foil of the present invention can be shaped by either mechanical or photoetching techniques. Furthermore, the use of foil allows the manufacturing process to be carried out with or without the use of a separate substrate. Separate substrates normally must be utilized in the manufacture of a head which is provided entirely by thin film deposition techniques. The absence of a substrate also allows the unitary laminate to be etched simultaneously on two surfaces, thus speeding and facilitating etching procedures.

Therefore, the present invention provides a technique for the economical fabrication of heads which is less demanding than additive thin film deposition techniques. All steps are essentially subtractive, and by using prefabricated materials, constant functional quality is obtained.

The foregoing and other objects, features and advantages of the invention will be apparent from the following more particular description of preferred embodiments of the invention as illustrated in the accompanying drawings.

DESCRIPTION OF THE PREFERRED EMBODIMENTS

Figure 1:
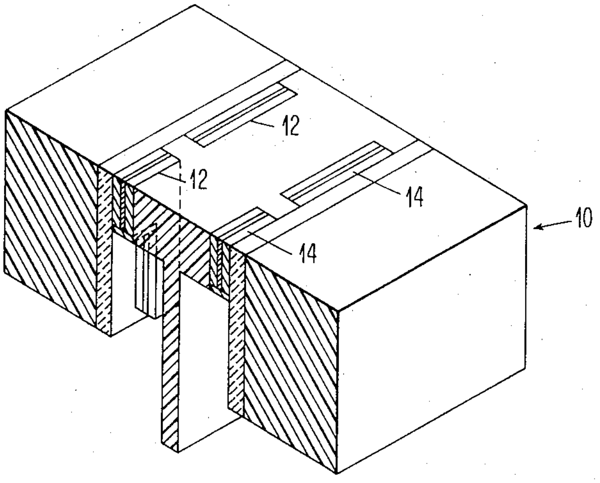
FIG. 1 is a perspective, sectional, exaggerated view of a multihead read/write transducer made in accordance with the present invention.

In carrying out the present invention, the actual materials utilized in forming a transducer as well as the shape and number of heads per transducer will be controlled by the ultimate use to which this structure is to be put.

The magnetic foil materials utilized in the present invention are preferably ductile and magnetically permeable. Included in these materials are nickel iron alloy compositions including many compositions containing 1 percent to about 15 percent of added elements or two or more added elements such as molybdenum, chromium, manganese, copper, vanadium, titanium, silicon, aluminum and tungsten. Also included are the iron-nickel-cobalt compositions, including compositions containing 1 percent to about 15 percent of added elements. Other suitable materials are the iron-cobalt series of materials, including those alloys having an iron content of 25 percent or higher, the balance chiefly cobalt, with or without small amounts of added elements. These materials are generally magnetically soft and permeable, ductile and conductive. Other suitable materials include most other magnetically permeable metals and alloys which can be produced in the form of a thin sheet of metal foil but does not exclude materials which, while predominantly metal, are brittle.

A specific group of especially attractive magnetic foil materials are 77–83 percent nickel, and 3–6 percent molybdenum, with the balance iron. Included in this group are many commercially available foils, such as HyMu 80, HYMu 800, Supermalloy, 4–79 molybdenum permalloy, English Mumetal, Muvar, and Supermax. Other suitable commercial alloys include Monimax (47 percent nickel, 3 percent molybdenum, balance iron), U.S. Mumetal (77 percent nickel, 5 percent copper, 2 percent chromium, balance iron), French Mumetal (78 percent nickel, 6 percent copper, 4 percent molybdenum, balance iron), permalloy (30 percent nickel as a minimum, balance iron), chrome permalloy (45 percent nickel, 6 percent chromium, balance iron) and Radiometal (45 percent nickel, 5 percent copper, balance iron). While the present invention is not limited to these materials, they are suitable for its practice.

A broad selection of conductive non-magnetic foil materials can also be utilized in the practice of this invention. Included in these conductive materials are copper, silver, gold, and their alloys. For example, alloys of copper with small additions of either silver or gold provide greatly improved wear characteristics to the conductor, while gold is especially easy to work with under annealing conditions. Aluminum foil may be utilized as the conductive material and is attractive for this purpose in its tendency to form a wear resistant and self-renewing oxide layer when it occupies an exposed position in the head gap. Other suitable materials for use as the conductor include hard, wear resistant metals, such as rhodium and platinum and their alloys. In general, any metal foil material which is substantially more conductive than the co-laminated magnetic foil material will be useful in the practice of the present invention.

Referring to FIG. 1, transducer 10 made in accordance with the present invention may consist of a plurality of write heads 12 and read heads 14, in combination, which operate together to read and write a plurality of related data tracks on a magnetic recording medium, not shown.

Figures 2, 3, 4:
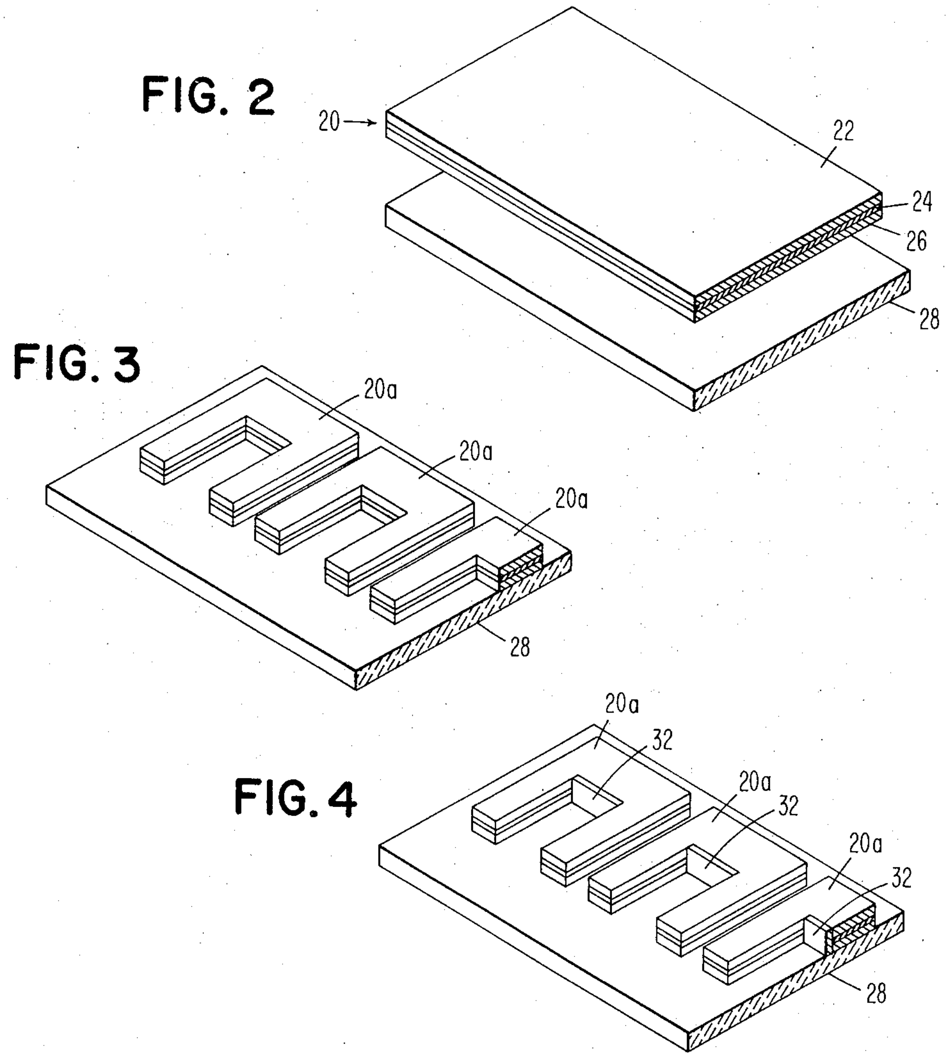
FIGS. 2–4 show the transducer of FIG. 1 manufactured in accordance with the process of this invention in successive stages of fabrication utilizing a laminated foil member.

Referring to FIG. 2, the first step in producing, for example, the read or write head section of the transducer of FIG. 1 involves procurement of a laminated foil 20, in this case consisting of a first magnetic layer 22, a central conductive foil 24 and a second magnetic foil 26 joined to form a monolithic thin foil structure. As illustrated in this preferred embodiment, a nonconductive substrate material 28 is also provided, and laminated foil 20 is then joined to it, for example, by the use of adhesive. The substrate material may be of ceramic, glass, quartz, non-magnetic ferrite, or other nonconductive material of choice. If the substrate 28 is selected from conductive material, it may be insulated by known techniques utilizing known insulating materials or insulating adhesives.

As illustrated by FIG. 3, a series of generally U-shaped non-serial laminated foils 20*a* have been produced from laminated foil 20, for example, by photoetching techniques. Where etching is utilized, well known procedures are followed. For example, the surface of the laminated foil is coated with a commercial photoresist, exposed in the desired pattern so that the photoresist can be removed from the foil which is to be removed, and then the foil is subjected to a suitable etchant, such as iron chloride, mineral acid, or other corrosive material. Following the etching procedure, the remaining photoresist is removed. The rectilinear shape and profile of laminated foils 20*a* are exaggerated for ease of illustration, as are the relative dimensions of the assembly.

Now referring to FIG. 4, the U-shaped laminated foils of FIG. 3 are provided with a magnetically permeable back gap material 32. The back gap material is provided, for example, by sputtering, evaporation, plating or other techniques. The shape and location of the back gap material can be controlled by the use of either photoetching techniques or by placing a metal mask of the desired size and shape between the source of magnetic material and the back gap area to be closed. The thus completed series of magnetic cores can then be placed within a housing and then reduced to a final dimension at the surface, for example, by grinding, to form a transducer such as that illustrated in FIG. 1.

Figure 5:
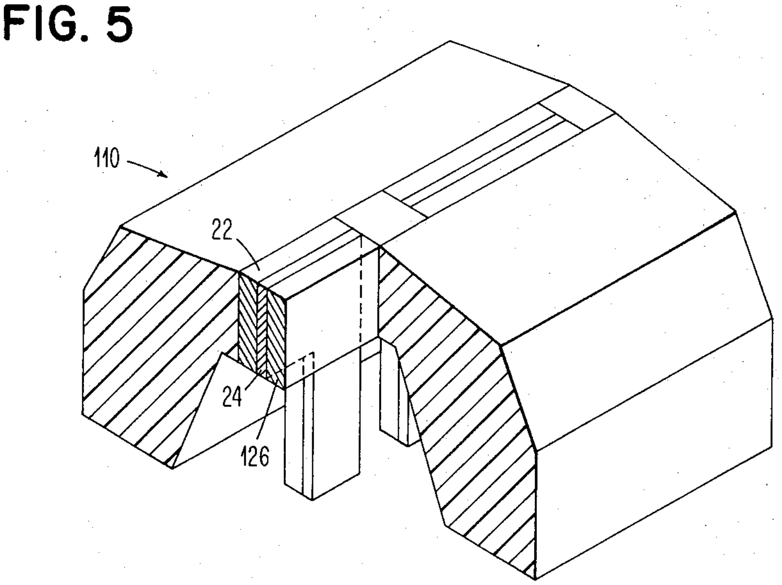
FIG. 5 is a perspective, sectional, exaggerated view of another embodiment of this invention wherein one magnetic foil is present only at the core area, and the back gap of the core is not closed with magnetically permeable material.

A modified form of transducer 110 made in accordance with the present invention is shown in a sectional exaggerated view at FIG. 5. In this modification, one magnetic foil member 126 is present only at that portion of the head required to complete the magnetic core. This modification may be obtained by either using a laminated foil structure in which one magnetic foil member is present initially only as a more narrow strip than the other foils, or, in the alternative, by removing that portion of the magnetic foil not required to form the magnetic core for example, by photoetching techniques. Note also, that in this embodiment, no substrate is utilized and no magnetic material is placed in the back gap. In yet another technique of making this form of the transducer, or for that matter, any transducer made in accordance with the present invention, a two-layer laminated foil consisting of one layer of magnetic foil and one layer of non-magnetic foil is utilized as the starting material. The additional layer of magnetic material required to complete the core is then provided by either thin film deposition techniques or the use of a magnetic foil member, either before or after the laminate is shaped.

Figure 6:
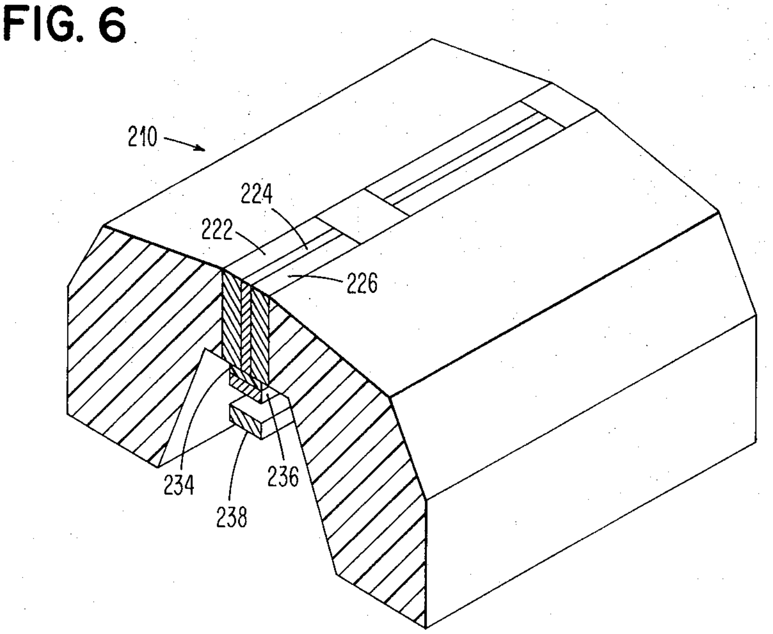
FIG. 6 is a perspective, sectional, exaggerated view of yet another embodiment of this invention wherein a magnetoresistive read element is included.

Referring now to FIG. 6, another embodiment 210 of the present invention is shown in a sectional, exaggerated perspective view. In this embodiment, no magnetic back gap has been provided either. Instead, at the back gap area, a nonconductive layer 234 insulates the magnetic core members from a thin deposited magnetoresistive film 236. Member 238 is positioned in proximity to the magnetoresistive film to provide a magnetic biasing field. The magnetoresistive film is also provided with electrical contacts, not shown, to provide a current path to and from the magnetoresistive element. As illustrated, this transducer can be utilized for writing by conventional electromagnetic techniques when exciting winding 224 is energized and for reading by magnetoresistive techniques. In this reading technique, changes in the magnetic field at the gap of the head cause changes in the resistance of the magnetoresistive element, which in turn causes a change in the voltage flowing through element 234. These changes can be read as an information signal. The magnetic legs 222 and 226 of this head provide both a flux focusing and shielding effect to the magnetoresistive element.

In the practice of this invention, the magnetic foil materials will typically be in a thickness range of about 0.05 mil to about 2.0 mils, with a thickness of no more than about 0.5 mil being preferred to avoid eddy current losses. In a three-layer laminate, one of the outer foils can be selectively thicker than the other to provide stiffness and ease of handling. In a similar manner, the conductive foil material will exhibit a thickness in the range of about 0.02 mil to about 0.10 mil, with a preferred thickness of about 0.04 mil, the upper limit of thickness being essentially a function of the thickness of the magnetic foil and geometry of the head. In addition to being desirable for high density recording, this thin gap geometry is easily protected by surrounding magnetic and housing materials. The wear characterisitcs of the gap are further improved by the use of wear resistant alloys. The gap may also be protected from uneven wear by the use of a wear resistant overlayer, or by selectively removing conductive material from the gap and replacing it with wear resistant material. In any event, the total thickness of the head, including the two magnetic foils and a single conductive layer is about 0.12 mil to about 4.1 mils, with a thickness of about 0.5 mil to about 1.5 mils preferred. The length of the head, that is, of the magnetic core, may range from about 1 to 10 mils, with a length of about 2 mils preferred.

The prefabricated foils of the present invention are made by any number of art known techniques. Most conveniently, foils of conductive and magnetic material are co-rolled and directionally annealed to simultaneously obtain monolithic bonding, desired final thickness and the desired wrought and annealed characteristics. No more than about a 95 percent thickness reduction can be achieved by rolling without re-annealing the foil. Alternatively, the individual foils can be formed at their approximate final thicknesses and then joined, for example, by diffusion bonding or other welding techniques or by co-rolling. The unitary laminate may even be formed by deposition or electroforming techniques as long as it is formed prior to utilization in the process of the present invention. Any other method of forming the laminate may also be utilized so long as the result is a well-bonded unitary structure. Annealing to improve the character of the magnetic portions may be carried out on the foil during or after its fabrication and also during or after its being shaped into a head, although the time and type of annealing, if any, is a matter of choice. Where annealing is carried out, it may be at temperatures in the range of about 900° to 2,000° F. and preferably under nonoxidizing conditions such as in vacuum or in a hydrogen atmosphere. Annealing temperatures in the range of about 1,100° to 1,400° F. are preferred.

While preferred embodiments of the present invention have been described in detail, other embodiments may be provided and still be within the scope of this invention. While heads with either a deposited permeable back gap or a nonpermeable back gap have been described, the core can be completed at the back gap by, for example, pinching, crimping or rolling the magnetic foils together. The back gap may also be completed using a magnetic shim. It may also be completed by etching a hole in the unitary foil at a first step, depositing magnetic material in the hole to bridge the magnetic foil, and then etching head tracks from the foil with the bridging magnetic material at the back gap of the head.

Single turn heads have been described, but multiturn heads may also be made in accordance with this invention. This is most conveniently done utilizing an open sandwich structure in which the conductive foil is initially exposed in the laminate. The thus exposed foil is etched in the shape of a coil and the circuit completed with additional conductive material. The magnetic core can then be completed by deposition techniques or by the use of a separate piece of magnetic foil.

It is noted that throughout the discussion of this invention, although metal foils are joined together or in contact, insulation is not generally used between the magnetic and non-magnetic metallic materials, nor is it required. This is due to the fact that the conductive non-magnetic material is generally so much more conductive than the conductive magnetic foil that the electric current applied or generated tends to follow the path of least resistance and stay within the conductive foil without the requirement for insulation between the conductive foil and the magnetic foil. However, it is within the scope of the present invention to provide electrical insulation between the conductive and magnetic foil. Where this is desired, any of the art known techniques or materials for providing insulation may be utilized. The use of such insulation would be particularly attractive in the preparation of a multiturn head.

While two and three layer laminates have been described, more complex laminates may be used in the practice of the present invention. For example, it may be desirable in some instances to use a double or triple magnetic foil structure on each side of the conductor, each magnetic foil being separated by insulation to avoid eddy current losses. Similarly, a multiturn head can be provided by using two or more conductive foils insulated from one another in the core area and joined in serial outside of the magnetic sandwich. Also, a six or more layer structure capable of providing both a read and write head, including intermediate shielding, can easily be visualized. Furthermore, nothing in the present invention dictates that the geometry of the heads be U-shaped or any other shape, so long as each head includes the essential elements of a magnetic core having a transducing gap and an exciting winding and it is constructed from a unitary laminate.

While photoetching has been described as the preferred means for forming the head from the laminated foil, other substractive techniques can be employed and still remain within the scope of the present invention. These include, for example, cutting with a laser beam or an electron beam or even mechanically, although this latter technique tends to introduce stress into the magnetic foil which degrades its permeability. Where photoetching is employed, the conductive foil can be selected of material, such as gold or a gold alloy, which will not be undercut during magnetic foil etching. Alternatively, the etching solution can be selected to avoid undercutting. If desired, the unitary laminate can be etched one layer at a time by using photoresist techniques. As previously noted, both flat surfaces of the laminate can be etched simultaneously. Where a substrate is used, the laminate can be attached to the substrate either before or after etching.

Heads made in accordance with this invention could operate in a range of recording densities (in flux reversals per inch), relative recording velocities (in inches per second), and track width (in mils) up to 50,000 FRI, 2,000 ips, and about 1 mil, respectively.

It is thus seen that in accordance with the present invention, high performance transducers have been economically provided which are comprised of discrete laminated metallic foil portions including both magnetic and conductive strata. Further, the use of both two layer and three layer foils is taught as are single and multiturn conductive windings. Furthermore, the process of this invention allows the avoidance of the use of a nonfunctional substrate material in the preparation of a batch-fabricated head, and it further allows the avoidance of many deposition and photoetching steps which are normally required in the prior art batch-fabrication of a head utilizing thin film deposited magnetic material rather than laminated foil. Where this technique is utilized to provide a multitrack head, since all of the tracks are cut from the same foil material there is no accumulation of track position tolerances. This makes it particularly easy to maintain a high degree of accuracy in the location of each track.

While the invention has been particularly shown and described with reference to preferred embodiments thereof, it will be understood by those skilled in the art that various changes in form and details may be made therein without departing from the spirit and scope of the invention.

What is claimed is:

1. The method of forming a magnetic transducer element including a magnetically permeable core portion and an exciting winding from unitary foil, a complete core having a pair of pole tips defining a transducing gap area and also having a back gap area, including the steps of:

obtaining a pre-existing unitary foil, said unitary foil being in the form of at least two metal foils joined together in a substantially monolithic structure, at least one foil being magnetically permeable and at least one foil being nonmagnetic and conductive; and then shaping said unitary foil into a transducer element by subtractive processes so that said magnetic foil portion of said unitary foil provides a core portion of said transducer element and said conductive foil portion of said unitary foil provides an exciting winding.

2. The method of claim 1 wherein said unitary foil consists of only two metal foils and wherein the magnetic core is completed by deposition of additional magnetic material in conjunction with the magnetically permeable foil portion of said unitary foil.

3. The method of claim 2 wherein the subtractive process utilized in shaping said unitary foil is photoetching.

4. The method of claim 1 wherein said unitary foil consists of only two metal foils and wherein the magnetic core is completed by the addition of a second magnetic foil in conjunction with the magnetically permeable foil portion of said unitary foil.

5. The method of claim 4 wherein the subtractive process utilized in shaping said unitary foil is photoetching.

6. The method of forming a magnetic transducer element including a magnetically permeable core portion and an exciting winding from unitary foil, said core having a transducing gap area and a back gap area, including the steps of:

obtaining a pre-existing unitary foil, said unitary foil being in the form of three metal foils joined together in a substantially monolithic structure, said three foils including two spaced-apart magnetically permeable foils with nonmagnetic, conductive foil therebetween; and then shaping said unitary foil into a transducer element by subtractive processes so that said magnetic foil portions of said unitary foil provide a core portion of said transducer element and said conductive foil portion of said unitary foil provides an exciting winding.

7. The method of claim 6 wherein said subtractive process utilized in shaping said unitary foil is photoetching.

8. The method of claim 6 wherein said two magnetic layers of said unitary foil are joined by magnetically permeable material at the back gap area.

9. The method of claim 6 wherein the magnetically permeable foil portions of said unitary foil have a thickness in the range of about 0.05 mil to about 2.0 mils and said conductive foil portion of said unitary foil has a thickness in the range of about 0.02 mil to about 0.10 mil.

10. The method of claim 9 wherein said subtractive process utilized in shaping said unitary foil is photoetching and wherein the magnetic foil portions of said unitary foil have a thickness of about 0.5 mil each and said conductive foil portion of said unitary foil has a thickness of about 0.04 mil.

* * * * *